Aug. 13, 1935.  G. M. J. RÖDEL  2,010,897
AUTOMATIC SAFETY CIRCUIT BREAKING DEVICE FOR VEHICLES
Filed March 3, 1934
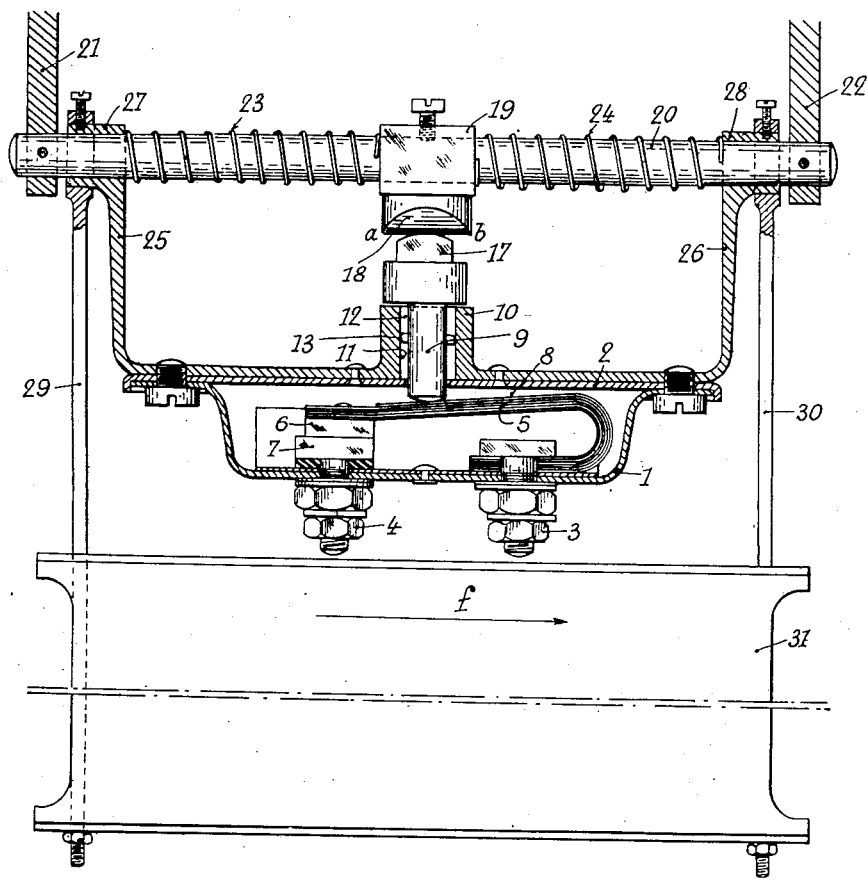
Guy Marie Jacques Rödel
INVENTOR
his ATTY.

Patented Aug. 13, 1935

2,010,897

UNITED STATES PATENT OFFICE 2,010,897

AUTOMATIC SAFETY CIRCUIT BREAKING DEVICE FOR VEHICLES

Guy Marie Jacques Rödel, Le Bouscat, France

Application March 3, 1934, Serial No. 713,816
In France March 8, 1933

3 Claims. (Cl. 200—52)

The present invention relates to safety devices for controlling the electric circuit of motor vehicles and other vehicles.

In view of the fact that the traffic of motor vehicles is constantly on the increase, and accidents are thus becoming numerous, it frequently happens that a vehicle, during an accident, will overturn or lie on one side, and the fuel thus spilled will be set on fire by sparks produced by short-circuits in the cables carrying the electric current, and the occupants are in danger of being burned alive. If such an occurrence should take place with a vehicle serving for the transport of passengers in common, this would result in a veritable catastrophe, for as a rule, the size of the exit door in this class of vehicles is too small to allow a rapid evacuation of the vehicle.

The present invention has for its object to provide an automatic circuit breaking device which when the vehicle, upon which it is mounted, assumes an abnormal degree of transverse inclination or is overturned, will cut off the storage battery, or any other source of electric energy, from the set of conducting wires, thus obviating all risk of short-circuits or sparking, which may cause fires, and will at the same time instantly stop the engine.

The apparatus in conformity with the invention is chiefly characterized by the fact that the movable part of the circuit-breaker is rigid with a pendulum and said two members are loosely mounted on a stationary rod carrying a stop which cooperates with a push-piece of the circuit-breaker for maintaining the circuit-breaker in the closed position as long as the vehicle upon which the device is mounted remains in a normal position.

The accompanying drawing, given solely by way of example, is an elevational view, with partial section, of an automatic device in conformity with the invention, in its normal position.

According to the embodiment shown in the drawing, the device comprises a box which consists for example of a casing 1 and a cover 2. This elongated box has the horizontal position and is parallel with the longitudinal plane of symmetry of the vehicle. To the casing 1, are secured, with the interposition of insulating material, two terminals 3 and 4 which are connected in series in the electric circuit of the vehicle.

The terminal 3 is electrically connected with a set of metal spring strips 5 which are bent at 180° in a horseshoe shape. This set of strips 5 carries at its free end a metal contact-piece 6, situated opposite a metal contact-piece 7 which is electrically connected with the terminal 4.

The curvature of the set of strips 5 is such that when they are left free, the strips hold the contact-piece 6 at a certain distance from the contact-piece 7.

To the set 5 of spring strips, is secured a strip 8 of insulating material, upon which a rod 9 forming a push-piece is caused to bear by its end which is preferably of insulating material. This rod is mounted so as to slide and to oscillate in a socket 10 which is secured to the cover 2. In the bore 11 of said socket 10 are formed one or more longitudinal grooves 12, for instance two grooves in the diametrically opposite position, in which may slide two respective studs 13 mounted on the rod 9.

The rod 9 carries, outside of the box 1—2, a head 17 which is preferably cylindrical. This head 17, under the action of the strips 5, bears against the surface 18 of a stop-piece 19. Preferably, the surface 18 is cylindrical, and its generatrices are perpendicular to those of the head 17, thus assuring, between the members 17 and 19, a contact surface which is practically reduced to a point.

The member 19 is secured to a rod 20 which is itself secured in supports 21 and 22.

Springs 23 and 24 surround the rod 20 and are interposed between the member 10 and the lugs 25—26 mounted on the cover 2 of the box 1, which, owing to the said lugs, is pivotally mounted on the rod 20. Arms 29—30 of a pendulum, the mass of which is constituted by the storage battery 31, are secured to the sleeves 27—28 whereby the casing 1 pivots about the rod 20.

The operation is as follows. In the case of an inclination or of a lateral overturning of the vehicle, the battery 31 will turn about the rod 20, which remains stationary, and for a given inclination $x$, the member 18 is released from the member 17, and the rod 9 is thus driven upwardly by the strips 5; the contact at 6—7 is hence broken.

When the vehicle strikes against an obstacle, the rod 20 is suddenly stopped, whilst the said pendulum tends to proceed upon its course by inertia in the direction of the arrow $f$, or in the contrary direction according to the direction of displacement of the vehicle with reference to the rod 20. The member 17 is thus released from the member 19 at one of its points $a$ or $b$. The rod 9 is hence driven out, and the contact at 6—7 is broken.

Having now described my invention what I claim as new and desire to secure by Letters Patent is:

1. An automatic safety circuit-breaking device, chiefly applicable to a vehicle, which comprises a supporting member, a rod secured to said supporting member, a stop secured to said rod, a circuit-breaker, loosely mounted on said rod, embodying a main body and contact-pieces resiliently spread apart, a push-piece slidably mounted in said body for closing said circuit-breaker and engaged by said stop in the closed position of the circuit-breaker, a spring connection along said rod between said stop and said circuit-breaker and a pendulum rigid with the circuit-breaker, whereby a predetermined longitudinal or transversal movement of the pendulum will cause the releasing of said push-piece from said stop and the opening of the circuit-breaker.

2. A device as claimed in claim 1 wherein said pendulum consists of the usual storage battery of the vehicle and of vertical arms carrying said battery.

3. A device as claimed in claim 1 wherein the contact surfaces of said stop and said push-piece are cylindrical and at right angles to one another.

GUY MARIE JACQUES RÖDEL.